United States Patent
Davis Jones et al.

(10) Patent No.: US 10,083,215 B2
(45) Date of Patent: Sep. 25, 2018

(54) MODEL-BASED DESIGN FOR TRANSFORMING DATA

(71) Applicant: International Business Machines Corporation, Armonk, NY (US)

(72) Inventors: Dale K. Davis Jones, Ocala, FL (US); Amol A. Dhondse, Pune (IN); Anand Pikle, Pune (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 14/679,068

(22) Filed: Apr. 6, 2015

(65) Prior Publication Data
US 2016/0292244 A1    Oct. 6, 2016

(51) Int. Cl.
*G06F 17/30*    (2006.01)

(52) U.S. Cl.
CPC .............................. *G06F 17/30569* (2013.01)

(58) Field of Classification Search
CPC ................................................. G06F 17/30569
See application file for complete search history.

(56) References Cited

U.S. PATENT DOCUMENTS

| | | | |
|---|---|---|---|
| 6,339,775 B1* | 1/2002 | Zamanian | G06F 17/30563 |
| 6,820,135 B1* | 11/2004 | Dingman | G06F 17/30569 |
| | | | 707/999.101 |
| 7,814,470 B2 | 10/2010 | Mamou et al. | |
| 8,219,518 B2 | 7/2012 | Jin et al. | |
| 8,260,813 B2 | 9/2012 | Coldicott et al. | |
| 8,266,579 B2 | 9/2012 | Kelly et al. | |
| 8,538,911 B2 | 9/2013 | Kass et al. | |
| 8,583,701 B2 | 11/2013 | Werner et al. | |
| 8,719,326 B2* | 5/2014 | Richard | H04L 9/3247 |
| | | | 709/201 |
| 8,730,040 B2 | 5/2014 | Donovan et al. | |
| 8,788,931 B1* | 7/2014 | Chen | G06F 17/2264 |
| | | | 715/234 |

(Continued)

FOREIGN PATENT DOCUMENTS

| | | |
|---|---|---|
| EP | 1939797 A1 | 7/2008 |
| EP | 2466493 A1 | 6/2012 |
| WO | 03088088 A1 | 10/2003 |

OTHER PUBLICATIONS

Ey, "Big Data: Changing the way businesses compete and operate", Apr. 2004, pp. 1-32.*

(Continued)

*Primary Examiner* — Jared M Bibbee
(74) *Attorney, Agent, or Firm* — Edward J. Wixtred, III

(57) ABSTRACT

A model-based approach for transforming data. A modeling framework that includes a plurality of rules for performing transformations of data is developed. A data unit is configured. The data unit is assigned to a job that includes one or more rules of the plurality of rules. The job transforms the data unit from a data format of a source system into a data format of a destination system. Usage statistics for at least one rule of the job are monitored. An aggregate rule is determined based on a first atomic rule and a second atomic rule. The first atomic rule and the second atomic rule are identified by at least one, or in part by a common pattern. A first rule of the job is identified based on the usage statistics of a plurality of data units. The first rule is removed from memory.

20 Claims, 3 Drawing Sheets

(56) References Cited

U.S. PATENT DOCUMENTS

| | | | |
|---|---|---|---|
| 9,515,886 B2* | 12/2016 | Shurman | H04L 41/0893 |
| 2003/0172368 A1 | 9/2003 | Alumbaugh et al. | |
| 2003/0233365 A1 | 12/2003 | Schmit et al. | |
| 2004/0083199 A1* | 4/2004 | Govindugari | G06F 17/30303 |
| 2007/0168857 A1* | 7/2007 | Roy | G06F 17/3092 |
| | | | 715/239 |
| 2008/0270977 A1* | 10/2008 | Nucci | G06F 8/10 |
| | | | 717/105 |
| 2009/0327208 A1* | 12/2009 | Bittner | G06F 17/30507 |
| | | | 706/61 |
| 2011/0153624 A1 | 6/2011 | Aigner et al. | |
| 2011/0314019 A1* | 12/2011 | Jimenez Peris | G06F 9/5066 |
| | | | 707/737 |
| 2014/0214382 A1 | 7/2014 | Haas et al. | |
| 2016/0191466 A1* | 6/2016 | Pernicha | H04L 63/20 |
| | | | 726/1 |

OTHER PUBLICATIONS

Ballard et al.; "IBM InfoSphere Streams: Accelerating Deployments with Analytic Accelerators"; IBM Redbooks; Feb. 2014, First Edition; pp. 1-556.

Cazzella, Stefano; "Model Driven Business Intelligence"; Stuttgart, Nov. 27, 2013; pp. 1-15; <http://www.slideshare.net/caccio/model-driven-business-intelligence-28740599>.

George et al. "Big Data Spectrum"; Infosys Limited, 2012, Bangalore, India; pp. 1-61.

Hughes et al.; "An Ontology Driven Information Architecture for Big Data and Diverse Domains"; EGU General Assembly 2013; Apr. 2013, Vienna, Austria, id. EGU2013-1715; pp. 1-2; <http://adsabs.harvard.edu/abs/2013EGUGA..15.1715H>.

"Semantic ETL and Semantic Data Warehouse"; TAS Information Intelligence, 2012; pp. 1-6; <http://www.semanticetl.com/semctl/semantic_etl_datawarehouse.html>.

* cited by examiner

MODEL-BASED DESIGN FOR TRANSFORMING DATA

BACKGROUND OF THE INVENTION

The present invention relates generally to the field of big data, and more particularly to providing a model-based approach for transforming data units.

Big data is a broad term for data sets that are so large or complex that the data sets are difficult to process using traditional data processing applications. Challenges include, without limitation: analysis; capture; curation; search; sharing; storage; transfer; visualization; and information privacy. Analysis of larger data sets can find new correlations to spot business trends, prevent diseases, combat crime, etc.

Big data is difficult to work with using most relational database management systems and desktop statistics and visualization packages, requiring, instead, massively parallel software running on tens, hundreds, or even thousands of servers. The level of difficulty varies depending on, for example, the capabilities of the organization managing the set and the capabilities of the applications that are used to process and analyze the data set in its domain.

Data is a set of values of qualitative or quantitative variables; more simply, pieces of data are individual pieces of information. Data is measured, collected, reported, and analyzed to be visualized using graphs or images.

In metadata and data warehousing, a data transformation converts a set of data values from the data format of a source data system into the data format of a destination data system. Data transformation can be divided into two steps: (1) data mapping maps data elements from the source data system to the destination data system and captures any transformation that must occur; and (2) code generation that creates the actual transformation program. Data element to data element mapping is frequently complicated by complex transformation that require one-to-many and many-to-one rules. When the data mapping is indirect via a mediating data model, the process is also called data mediation. The code generation step takes the data element mapping specification and creates an executable program that can be run on a computer system. Code generation can also create transformation in easy-to-maintain computer languages.

A master data recast is another form of data transformation, where the entire database of data values is transformed, or recast, without extracting the data from the database. All data in a well-designed database is directly or indirectly related to a limited set of master database tables by a network of foreign key constraints. Each foreign key constraint is dependent upon a unique database index from the parent database table. Therefore, when the proper master database table is recast with a different unique index, the directly or indirectly related data are also recast or restated. The directly or indirectly related data may also still be viewed in the original form since the original unique index still exists with the master data. Also, the database recast should be done in such a way as to not impact the application's architecture software.

SUMMARY

According to one embodiment of the present invention, a method for a model-based approach for transforming data is provided. The method includes developing, by one or more processors, a modeling framework, wherein the modeling framework includes a plurality of rules for performing transformations of data; configuring, by one or more processors, a data unit, wherein the data unit is assigned to a job that includes one or more rules of the plurality of rules, and wherein the job transforms the data unit from a data format of a source system into a data format of a destination system; monitoring, by one or more processors, usage statistics for at least one rule of the job; determining, by one or more processors, an aggregate rule based on a first atomic rule of the plurality of rules and a second atomic rule of the plurality of rules, wherein the first atomic rule and the second atomic rule are identified by at least one, or in part by a common pattern; identifying, by one or more processors, a first rule of the job based on the usage statistics of a plurality of data units; and removing, by one or more processors, the first rule from memory.

According to another embodiment of the present invention, a computer program product for providing a model-based design for transforming data. The computer program product comprises a computer readable storage medium and program instructions stored on the computer readable storage medium. The program instructions include program instructions to develop a modeling framework, wherein the modeling framework includes a plurality of rules for performing transformations of data; program instructions to configure a data unit, wherein the data unit is assigned to a job that includes one or more rules of the plurality of rules, and wherein the job transforms the data unit from a data format of a source system into a data format of a destination system; program instructions to monitor usage statistics for at least one rule of the job; program instructions to determine an aggregate rule based on a first atomic rule of the plurality of rules and a second atomic rule of the plurality of rules, wherein the first atomic rule and the second atomic rule are identified by at least one, or in part by a common pattern; program instructions to identify a first rule of the job based on the usage statistics of a plurality of data units; and program instructions to remove the first rule from memory.

According to another embodiment of the present invention, a computer system for providing a model-based design for transforming data is provided. The computer system includes one or more computer processors, one or more computer readable storage media, and program instructions stored on the computer readable storage media for execution by at least one of the one or more processors. The program instructions include program instructions to develop a modeling framework, wherein the modeling framework includes a plurality of rules for performing transformations of data; program instructions to configure a data unit, wherein the data unit is assigned to a job that includes one or more rules of the plurality of rules, and wherein the job transforms the data unit from a data format of a source system into a data format of a destination system; program instructions to monitor usage statistics for at least one rule of the job; program instructions to determine an aggregate rule based on a first atomic rule of the plurality of rules and a second atomic rule of the plurality of rules, wherein the first atomic rule and the second atomic rule are identified by at least one, or in part by a common pattern; program instructions to identify a first rule of the job based on the usage statistics of a plurality of data units; and program instructions to remove the first rule from memory.

DETAILED DESCRIPTION

The big data paradigm involves characteristics such as volume (i.e., the amount of data), velocity (i.e., the speed of data in and out), veracity (i.e., the quality of data), and/or variety (i.e., the range of data types and sources) of data. The relative importance of each of these attributes in data processing varies across businesses and industries.

While offline and/or batch processing still applies to many data types, embodiments of the present invention recognize that there is an increasing need in industry to process vast quantities of data at, or near, real time velocity. Regardless of the data types or the speed of processing requirements, current solutions do not provide a model-based design at the data unit level. A data unit is a portion of data of a particular data type, for example primitive data types or composite data types. For example, when mediation or transformation needs to be performed on structured, unstructured, and/or semi-structured data, the data is hard coded through codified transformation or map-based transformations. Hard coding is to build absolute and unchangeable values into a program such that the values can only be changed by modifying the source code and recompiling.

Embodiments of the present invention recognize several problems with the current state of big data processing. Hard coded transformations are specific to only a particular message. Jobs that are meant for such tasks cannot be shared by other similar streams. In other words, other similar streams are not aware of such transformations taking place. Hard coded ecosystems do not facilitate resources to be utilized across multiple users. Processing big data in this way requires highly skilled and expensive resources, which are limited in supply. Embodiments of the present invention provide a model-based design at the data unit level.

Embodiments of the present invention will now be described in detail with reference to the Figures.

Figure 1:
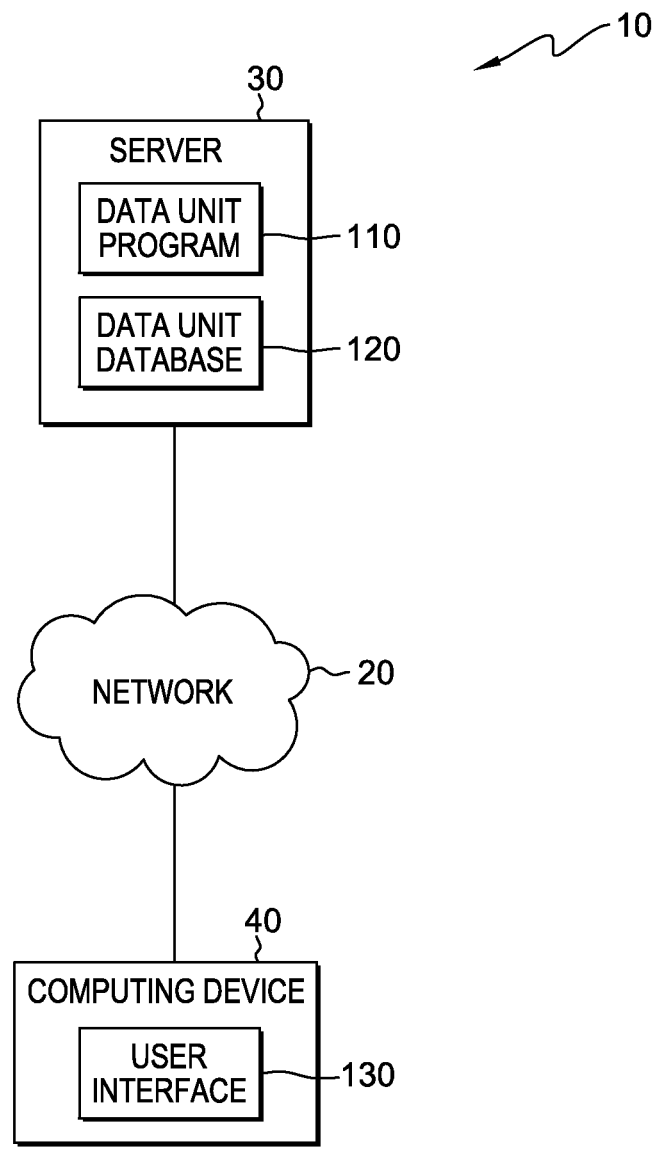
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains data unit program 110 and data unit database 120. In other embodiments, server 30 may include data unit program 110, data unit database 120, and/or other components, as depicted and described in further detail with respect to FIG. 3.

Computing device 40 may be a desktop computer, laptop computer, netbook computer, or tablet computer. In general, computing device 40 may be any electronic device or computing system capable of processing program instructions, sending and receiving data, and communicating with server 30 via network 20. In the depicted embodiment, computing device 40 contains user interface 130. In other embodiments, computing device 40 may include user interface 130 and/or other components, as depicted and described in further detail with respect to FIG. 3.

User interface 130 may be any user interface used to access information from server 30, such as information gathered and produced by data unit program 110. In one embodiment, user interface 130 may be a generic web browser used to retrieve, present, and process information resources from the Internet. In other embodiments, user interface 130 may be a software program or application that enables a user of computing device 40 to access server 30 over network 20. In some embodiments, user interface 130 may be a graphical user interface (GUI) that allows users to interact with electronic devices through graphical icons and visual indicators, such as secondary notation, as opposed to text-based interfaces, typed command labels, or navigation. In the depicted embodiment, user interface 130 resides on computing device 40. In other embodiments, user interface 130, or similar user interfaces, may reside on another computing device, another server, or server 30, provided that user interface 130 is accessible to data unit program 110.

Data unit program 110 provides a model-based design for transforming data units. In doing so, data unit program 110 develops a modeling framework. Data unit program 110 selects jobs. Data unit program 110 identifies and configures data units. Data unit program 110 deploys data units. Data unit program 110 monitors data units. Data unit program 110 determines whether a common pattern of data units are identified and whether the deployed data units are being used. Data unit program 110 stores data units in the form of rules to a library or removes the rules from memory. In the depicted embodiment, data unit program 110 resides on server 30. In other embodiments, data unit program 110 may reside on another server, computing device, or computing device 40, provided that data unit program 110 can access data unit database 120 and user interface 130 via network 20.

Data unit database 120 may be a repository that may be written to and/or read by data unit program 110. In some embodiments, a program (not shown) may allow an administrator or other user to define rules to be used for enabling a model-based approach for transforming data. Such a program may further allow for storing the rules to data unit database 120. In other embodiments, data unit database 120 may store learned rules. The present invention has the ability to self-learn and evolve to build an extended repository of rules based on new sets of data units being analyzed and processed.

In other embodiments, data unit database 120 is a knowledge base that is governed by an ontology. A knowledge base is a technology used to store complex structured and unstructured information used by a computer system. A knowledge-based system consists of a knowledge base that represents facts and an inference engine that can reason about those facts and use rules and other forms of logic to deduce facts or highlight inconsistencies. In some embodiments, information stored in a knowledge base may include: function categories; descriptions; services; service functions; capabilities and configurations; and WordNet (a lexical database for the English language). An ontology is a formal, explicit specification of a shared abstract simplified view of some selected part of the world, containing the objects, concepts, and other entities that are presumed of interest for some particular purpose and the relationships between them. In some embodiments, an ontology may use the information stored in a knowledge base to form and identify the relationships between different services.

In the depicted embodiment, data unit database 120 resides on server 30. In other embodiments, data unit database 120 may reside on another server, computing device, or computing device 40, provided that data unit database 120 is accessible to data unit program 110 via network 20.

Figure 2:
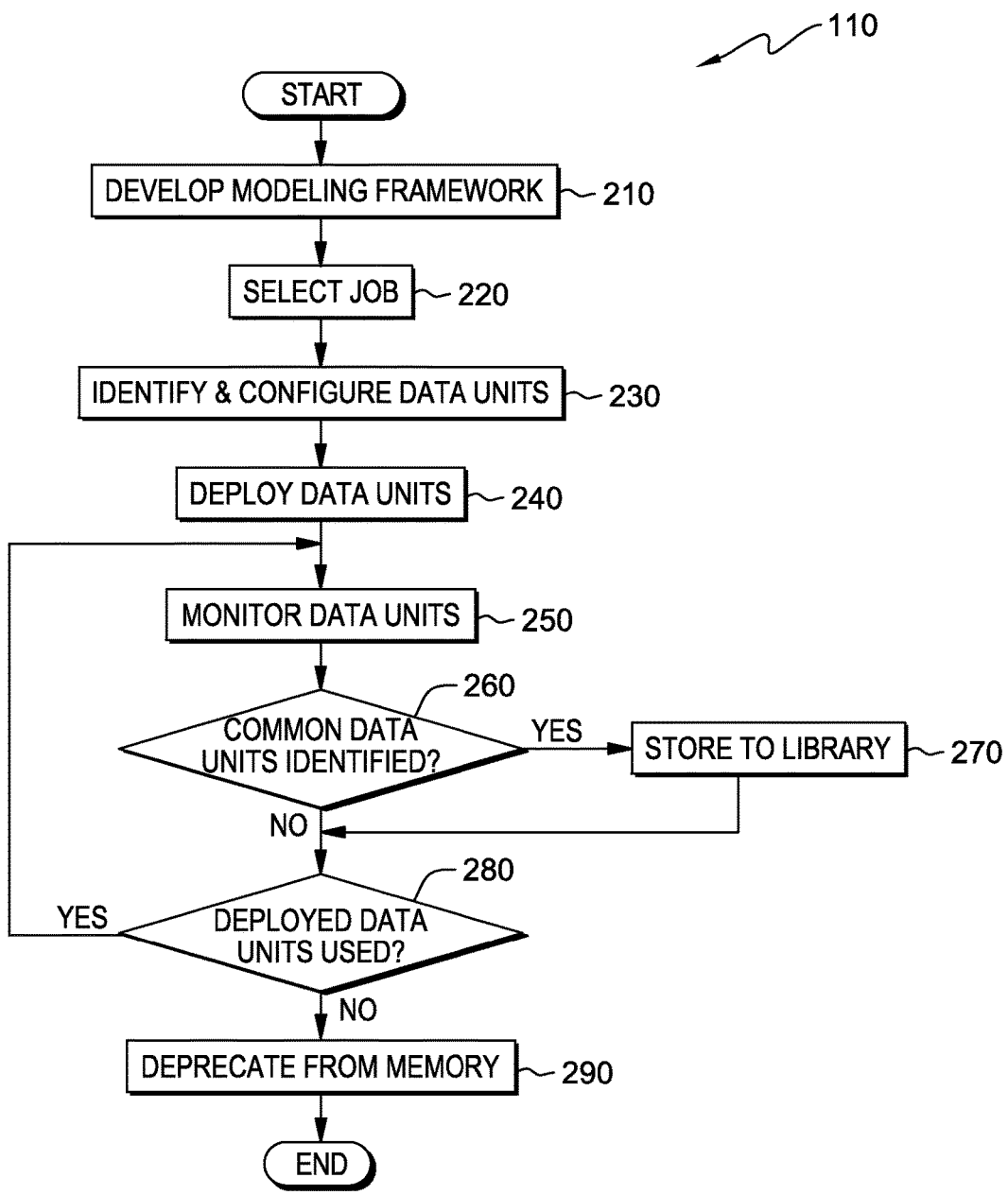
FIG. 2 depicts a flowchart of the steps of a data unit program, executing within the computing system of FIG. 1, for providing a model-based design for transforming data units, in accordance with an embodiment of the present invention.

FIG. 2 depicts a flowchart of the steps of a data unit program, executing within the computing system of FIG. 1, in accordance with an embodiment of the present invention. Data unit program 110 provides a model-based design for transforming data units.

In step 210, data unit program 110 develops a modeling framework. In one embodiment, data unit program 110 allows an administrator to develop an initial modeling framework. In some embodiments, data unit program 110 develops an initial modeling framework. To develop an initial modeling framework, in one embodiment, data unit program 110 stores model-driven rules for atomic data units to data unit database 120. Atomic data units are primitive data types, such as: byte, short, int, long, char, boolean, float and double. Atomic data units are data units that are not built from other data units. In other embodiments, data unit program 110 stores pre-defined rules for atomic data units to data unit database 120, where the rules are defined by an administrator. The rules for atomic data units may be called atomic rules.

In one embodiment, data unit program 110 allows an administrator to use atomic rules to build aggregate rules, which are stored to data unit database 120. In other embodiments, data unit program 110 uses atomic rules to build aggregate rules and stores the aggregate rules to data unit database 120. Aggregate rules are used in the transformation of data units. Aggregate rules are a combination of atomic data rules. For example, two atomic rules could be: "Gender=F" and "age>50." When the two atomic rules are combined and used together, an aggregate rule could be: "If Gender=F and age>50."

In step 220, data unit program 110 selects jobs. A job is a series of transformations. The job may be performed on data from a source data system after which the transformed data is moved to a destination data system.

In step 230, data unit program 110 identifies and configures data units. Configuring the data units involves making the data units ready for deployment. In one embodiment, data unit program 110 allows an administrator to identify a data unit, drag and drop, and assign the data unit to inbound source message types, properties, metadata, tenants, and/or user groups. The present invention specifies a library of data units which are specific to semantic, syntactic, segregation, and aggregation types that the administrator drags and drops and points to the source and destination elements. This is available for structured and/or unstructured representations.

In another embodiment, data unit program 110 identifies a data unit and assigns the data unit to inbound source message types, properties, metadata, tenants, and/or user groups, based on the association of rules to inbound messages that are associated using criteria based on structure, metadata, content type, etc. In configuring data units, in some embodiments, data units include an association of rule criteria with the transformation that needs to be applied to the message, record, or content.

Data units may be structured data and/or unstructured data. In one embodiment, a data unit will go from structured data to unstructured data, for example, "StreetAddress+City=AddressInformation." In other embodiments, a data unit will go from unstructured data to structured data, for example, "AddressInformation=StreetAddress+City." Additionally, data units may include various types of transformation data units, including, semantic, syntactic, and/or rules.

In step 240, data unit program 110 deploys data units. Deployment includes all activities needed to make the data units available for use, such as release. The release activity follows the completed development process of the data unit, including all of the operations to prepare a data unit for assembly and transfer to the destination data system. Therefore, it must determine the resources required to operate at the destination data system and collect information for carrying out subsequent activities of the deployment process.

In one embodiment, data unit program 110 deploys data units after a data transformation converts the data units from a data format of a source data system into the data format of a destination data system. In other embodiments, data unit program 110 deploys data units without a need for data transformation, because the format of a source data system matches the format of a destination data system.

In step 250, data unit program 110 monitors data units. In some embodiments, there are predetermined monitoring policies that guide the monitoring of data unit program 110. In one embodiment, data unit program 110 monitors data units to analyze and refine the rules on a dynamic basis. Monitoring dynamic (i.e., constantly changing) data units allows data unit program 110 to release resources based on certain criteria. In one embodiment, data unit program 110 dynamically refines rules based on the structure, metadata, and/or content type of atomic data units. In other embodiments, data unit program 110 dynamically refines rules based on tenants and/or user groups.

In other embodiments, data unit program 110 monitors the addition of data units within new streams. A stream is a sequence of data elements made available over time. Data is split into streams to facilitate parallel processing. Each stream contains the same data, but different operations are performed on each stream in parallel. After the streams complete, the results of each stream are combined.

In one embodiment, data unit program 110 monitors the usage statistics of atomic data units within various streams to determine if certain rules are being used. In other embodiments, data unit program 110 monitors the usage statistics of aggregate data units within various streams to determine if certain rules are being used. Aggregate data units are data from any other classes of data types other than primitive data types, such as from composite data types. Composite types are derived from more than one primitive type and examples include: arrays, records, unions, and/or objects. In one embodiment, data unit program 110 monitors data within single streams. In other embodiments, data unit program 110 monitors data within multiple streams that executes dissimilar jobs. Still, in some embodiments, data unit program 110 monitors data within multiple streams that executes similar jobs.

An example of atomic data units identified multiple times in the same stream may be shown by the atomic rule: "Gender=F" identified twice in Stream 1. An example of an atomic data unit identified in multiple streams may be shown by the atomic rule: "Gender=F" identified in Stream 1 and 3. An example of atomic data units identified multiple times in the same stream may be shown by the aggregate rule: "If Gender=F and Age>50" identified twice in Stream 1. An example of atomic data units in multiple streams may be shown by the aggregate rule: "If Gender=F and Age>50" identified in Streams 1 and 3.

In embodiments of the present invention, data unit program 110 monitors the usage statistics of each rule of a job. In one embodiment, there is a predetermined threshold for the number of usages needed for a rule to remain in memory. In other embodiments, the rules have inputs and outputs that are monitored by data unit program 110.

In decision 260, data unit program 110 determines whether a common pattern of data units are identified. In one embodiment, data unit program 110 determines whether a common pattern of atomic data units are identified. In other embodiments, data unit program 110 determines whether a common pattern of aggregate data units are identified. In one embodiment, a common pattern of data units, atomic and/or aggregate, are identified as matching in a single stream. In other embodiments, a common pattern of data units, atomic and/or aggregate, are identified as matching in multiple streams.

If a common pattern of data units are identified (decision 260, yes branch), data unit program 110 stores the identified common pattern of data units in the form of rules to a library, such as data unit database 120 (step 270). Data unit program 110 allows data unit database 120 to continuously self-learn and build a library of rules based on the categorization and matching of data units and apply the rules based on run-time analysis. In some embodiments, data unit program 110 maintains data unit database 120 for administration services, such as, role-based access, quality control, and/or versioning. In other embodiments, data unit program 110 allows data units to be available as discoverable units, where the data units are made available to multiple tenants through data transformation registry services.

After data unit program 110 stores the identified common pattern of data units in the form of rules to data unit database 120, data unit program 110 determines whether the deployed data units are being used (decision 280). Alternatively, if a common pattern of data units are not identified (decision 260, no branch), then data unit program also determines whether the deployed data units are being used (decision 280). If the deployed data units are being used (decision 280, yes branch), then data unit program 110 monitors the data units again (step 250). If the deployed data units are not being used (decision 280, no branch), for example if a predetermined usage threshold is not met (meaning below the predetermined threshold), then data unit program 110 removes the rules involving those data units from memory (step 290). Data unit program 110 also discards redundant rules based on monitoring the usage statistics of the inputs and outputs of the rules, which enables data unit program 110 to free up resources for other needs. An example of an atomic data unit not being used may be: "M" unused in all presently active streams, therefore, the rule "Gender=M" will be discarded.

Figure 3:
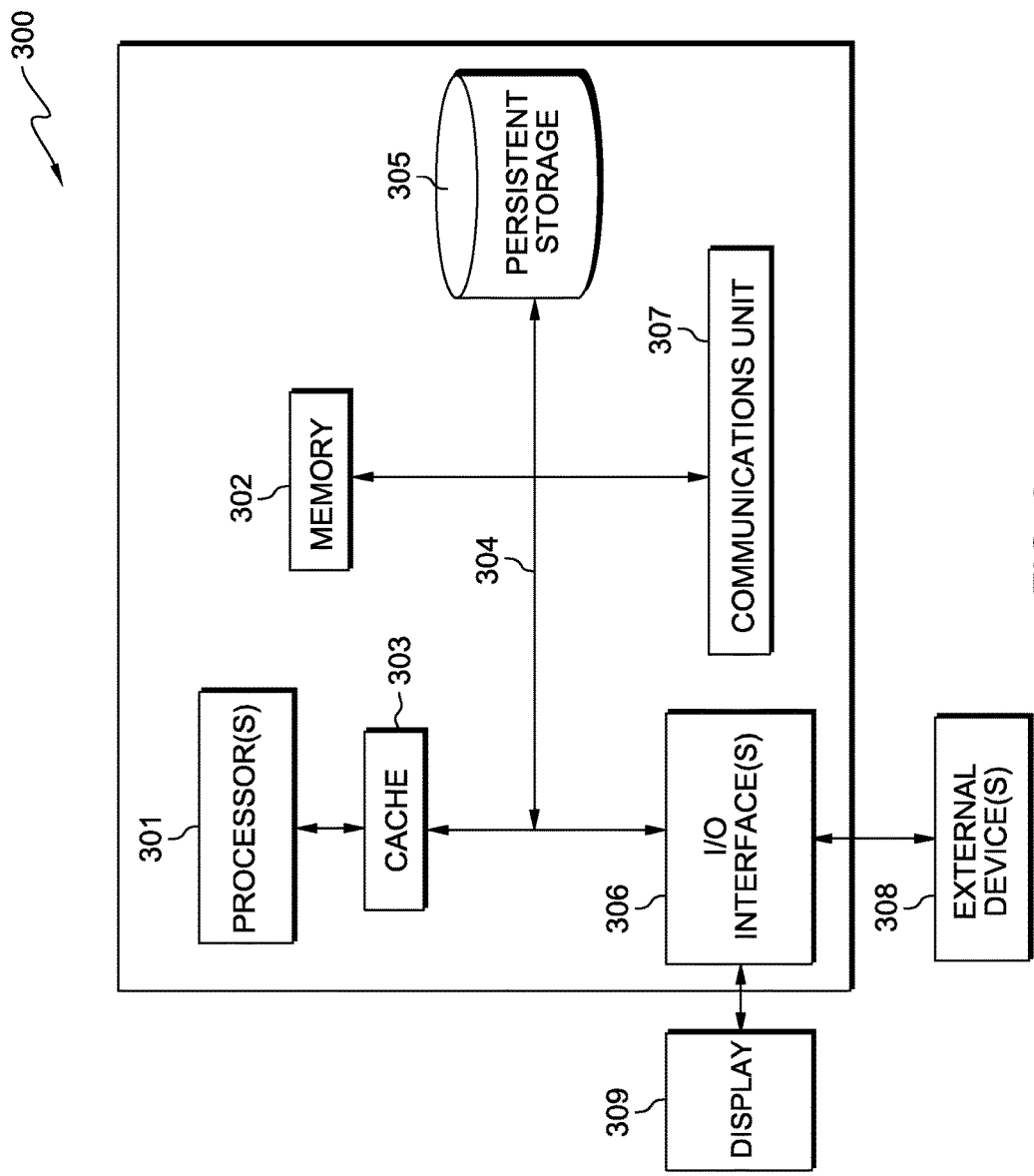
FIG. 3 depicts a block diagram of components of the server and/or the computing device, in accordance with an embodiment of the present invention.

FIG. 3 depicts computer system 300, which is an example of a system that includes components of server 30 and/or computing device 40. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Data unit program 110 and data unit database 120 may be downloaded to persistent storage 305 of server 30 through communications unit 307 of server 30. User interface 130 may be downloaded to persistent storage 305 of computing device 40 through communications unit 307 of computing device 40.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., data unit program 110 and data unit database 120, can be stored on such portable computer readable storage media and can be loaded onto persistent storage 305 of server 30 via I/O interface(s) 306 of server 30. Software and data used to practice embodiments of the present invention, e.g., user interface 130, can be stored on such portable computer readable storage media and can be loaded onto persistent storage 305 of computing device 40 via I/O interface(s) 306 of computing device 40. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing a model-based design for transforming data, the method comprising:
    developing, by one or more processors, a modeling framework, wherein the modeling framework includes a plurality of rules for performing transformations of data;
    configuring, by one or more processors, a data unit, wherein the data unit is assigned to a job that includes one or more rules of the plurality of rules, and wherein the job transforms the data unit from a data format of a source system into a data format of a destination system;
    monitoring, by one or more processors, usage statistics for at least one rule of the job, wherein a plurality of data units are split into a first stream and a second stream for parallel processing, wherein different operations are performed on each stream in parallel, and wherein results of each stream are combined;
    determining, by one or more processors, a pattern in at least one data unit of the first stream and at least a second data unit of the second stream;
    determining, by one or more processors, an aggregate rule based on a first atomic rule of the plurality of rules and a second atomic rule of the plurality of rules, wherein the first atomic rule and the second atomic rule are identified, in part, by the pattern;
    identifying, by one or more processors, a first rule of the job based on failing to meet a predetermined threshold of usage of data units assigned to the job that include the first rule;
    removing, by one or more processors, the first rule from memory, based on the first rule of the job failing to meet the predetermined threshold; and
    configuring, by one or more processors, a subsequent data unit, wherein:
        the subsequent data unit is assigned to a subsequent job that includes the aggregate rule; and
        the subsequent job transforms the subsequent data unit from the data format of the source system into the data format of the destination system.

2. The method of claim 1, wherein the usage statistics of the first rule indicate that a usage of the first rule is below a predetermined threshold.

3. The method of claim 1, wherein the usage statistics of the first rule indicate that the first rule and a second rule outputs are redundant.

4. The method of claim 1, wherein configuring the data unit is based on input received via a user interface.

5. The method of claim 4, wherein the user interface is adapted for dragging and dropping of data units to elements of the source system and the destination system.

6. The method of claim 1, wherein a defined monitoring policy retains a second rule of the plurality of rules, wherein the second rule is associated with the data unit that is most recently used.

7. The method of claim 1, wherein the first atomic rule identifies a first data unit of a first primitive data type, wherein the second atomic rule identifies a second data unit of a second primitive data type, and wherein the aggregate rule comprises a composite data type that is based on the first primitive data type and the second primitive data type.

8. A computer program product for providing a model-based design for transforming data, the computer program product comprising:
    one or more computer readable storage media and program instructions stored on the one or more computer readable storage media, the program instructions comprising:
    program instructions to develop a modeling framework, wherein the modeling framework includes a plurality of rules for performing transformations of data;
    program instructions to configure a data unit, wherein the data unit is assigned to a job that includes one or more rules of the plurality of rules, and wherein the job transforms the data unit from a data format of a source system into a data format of a destination system;
    program instructions to monitor usage statistics for at least one rule of the job, wherein a plurality of data units are split into a first stream and a second stream for parallel processing, wherein different operations are performed on each stream in parallel, and wherein results of each stream are combined;
    program instructions to determine a pattern in at least one data unit of the first stream and at least a second data unit of the second stream;
    program instructions to determine an aggregate rule based on a first atomic rule of the plurality of rules and a second atomic rule of the plurality of rules, wherein the first atomic rule and the second atomic rule are identified, in part by, the pattern;
    program instructions to identify a first rule of the job based on failing to meet a predetermined threshold of usage of data units assigned to the job that include the first rule;
    program instructions to remove the first rule from memory, based on the first rule of the job failing to meet the predetermined threshold; and
    program instructions to configure a subsequent data unit, wherein:
        the subsequent data unit is assigned to a subsequent job that includes the aggregate rule; and
        the subsequent job transforms the subsequent data unit from the data format of the source system into the data format of the destination system.

9. The computer program product of claim 8, wherein the usage statistics of the first rule indicate that a usage of the first rule is below a predetermined threshold.

10. The computer program product of claim 8, wherein the usage statistics of the first rule indicate that the first rule and a second rule outputs are redundant.

11. The computer program product of claim 8, wherein configuring the data unit is based on input received via a user interface.

12. The computer program product of claim 11, wherein the user interface is adapted for dragging and dropping of data units to elements of the source system and the destination system.

13. The computer program product of claim 8, wherein a defined monitoring policy specifies to retain a second rule of the plurality of rules, wherein the second rule is associated with the data unit that is most recently used.

14. The computer program product of claim 8, wherein the first atomic rule identifies a first data unit of a first primitive data type, wherein the second atomic rule identifies a second data unit of a second primitive data type, and wherein the aggregate rule comprises a composite data type that is based on the first primitive data type and the second primitive data type.

15. A computer system for a model-based approach for transforming data, the computer system comprising:
one or more computer processors, one or more computer readable storage media, and program instructions stored on the computer readable storage media for execution by at least one of the one or more processors, the program instructions comprising:
program instructions to develop a modeling framework, wherein the modeling framework includes a plurality of rules for performing transformations of data;
program instructions to configure a data unit, wherein the data unit is assigned to a job that includes one or more rules of the plurality of rules, and wherein the job transforms the data unit from a data format of a source system into a data format of a destination system;
program instructions to monitor usage statistics for at least one rule of the job, wherein a plurality of data units are split into a first stream and a second stream for parallel processing, wherein different operations are performed on each stream in parallel, and wherein results of each stream are combined;
program instructions to determine a pattern in at least one data unit of the first stream and at least a second data unit of the second stream;
program instructions to determine an aggregate rule based on a first atomic rule of the plurality of rules and a second atomic rule of the plurality of rules, wherein the first atomic rule and the second atomic rule are identified, in part, by the pattern;
program instructions to identify a first rule of the job based on failing to meet a predetermined threshold of usage of data units assigned to the job that include the first rule;
program instructions to remove the first rule from memory, based on the first rule of the job failing to meet the predetermined threshold; and
program instructions to configure a subsequent data unit, wherein:
the subsequent data unit is assigned to a subsequent job that includes the aggregate rule; and
the subsequent job transforms the subsequent data unit from the data format of the source system into the data format of the destination system.

16. The computer system of claim 15, wherein the usage statistics of the first rule indicate that a usage of the first rule is below a predetermined threshold.

17. The computer system of claim 15, wherein the usage statistics of the first rule indicate that the first rule and a second rule outputs are redundant.

18. The computer system of claim 15, wherein configuring the data unit is based on input received via a user interface.

19. The computer system of claim 18, wherein the user interface is adapted for dragging and dropping of data units to elements of the source system and the destination system.

20. The computer system of claim 15, wherein a defined monitoring policy retains a second rule of the plurality of rules, wherein the second rule is associated with the data unit that is most recently used.

* * * * *